United States Patent
Efstathiou

(10) Patent No.: US 6,404,825 B1
(45) Date of Patent: Jun. 11, 2002

(54) DIGITAL RADIO RECEIVER LOCK DETECTOR

(75) Inventor: Dimitrios Efstathiou, Greensboro, NC (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/275,210

(22) Filed: Mar. 24, 1999

Related U.S. Application Data

(60) Provisional application No. 60/079,450, filed on Mar. 26, 1998.

(51) Int. Cl.[7] .......................... H04L 27/14; H04L 27/16; H04L 27/22
(52) U.S. Cl. ...................... 375/326; 375/327; 375/344; 455/199.2
(58) Field of Search ................................ 375/326, 327, 375/344, 375, 376; 327/156, 159; 455/136, 139, 164.2, 164.1, 182.1–182.3, 183.1, 183.2, 184.1, 185.1, 186.1, 186.2, 187.1, 192.1–192.3, 255, 257, 265

(56) References Cited

U.S. PATENT DOCUMENTS

| | | | |
|---|---|---|---|
| 4,947,409 A | * | 8/1990 | Raith et al. .................. 375/344 |
| 5,471,508 A | * | 11/1995 | Koslov ......................... 375/344 |
| 5,940,450 A | * | 8/1999 | Koslov et al. ............... 375/344 |

(List continued on next page.)

OTHER PUBLICATIONS

"The split symbol moments SNR Estimator in Narrow–band channels", by B. Shah, IEEE Transactions on Aerospace and Electronic Systems, vol. 26, No. 5, Sep. 1990, pp. 737–747.
"Universal carrier recovery loop for QASK and PSK signal sets", by A. Leclert, P. Vandamme, IEEE Transactions on Communications, vol. COM–31, No. 1, Jan. 1983, pp. 130–136.

"Comparison of Estimators for Frequency Offset", by J. Wolf, J. Schwartz, IEEE Transactions on Communications, vol. 38, No. 1, Jan. 1990, pp. 124–127.

(List continued on next page.)

*Primary Examiner*—Chi Pham
*Assistant Examiner*—Phuong Phu
(74) *Attorney, Agent, or Firm*—Samuels, Gauthier & Stevens, LLP

(57) ABSTRACT

A digital radio tuner lock detector receives an in-phase (I) data signal and a quadrature (Q) data signal. The lock detector processes these signals to compute a data signal power estimate and integrates the data signal power estimate to provide a threshold signal value. The lock detector also includes a carrier frequency lock detector and a carrier phase lock detector. The carrier frequency lock detector receives the I and Q data signals and computes a frequency error signal and integrates the frequency error signal to provide an integrated frequency error signal. The carrier frequency lock detector compares the magnitude of the integrated frequency error signal to the threshold signal value to determine if frequency lock has been achieved and provides a frequency lock status signal indicative thereof. The carrier phase lock detector receives the I and Q data signals and computes a phase error signal and integrates the phase error signal to provide an integrated phase error signal. The phase lock detector also compares the magnitude of the integrated phase error signal to the threshold signal value to determine if carrier phase lock has been achieved. Carrier frequency recovery occurs first and when the carrier frequency lock detector identifies carrier frequency lock, carrier phase recovery is then performed. Once the carrier phase lock detector identifies phase lock, then accurately received data is available for signal processing. The detector may be employed in either full digital demodulators (i.e., parameter estimation and correction are performed digitally) or hybrid demodulators (i.e., parameter estimation is performed digitally and carrier frequency and phase correction are performed in the continuous time domain).

8 Claims, 3 Drawing Sheets

U.S. PATENT DOCUMENTS 6,269,118 B1 * 7/2001 Hanna et al. ............... 375/233
6,289,069 B1 * 9/2001 Meyer ........................ 375/376

OTHER PUBLICATIONS

"Comparison between digital recovery techniques in the presence of frequency shift", by F. Daffara, J. Lamour, 1994 International Communications Conference, pp. 940–945.

"Digital Demodulator Synchronisation: Acquisition Performance and Implementation Aspects", by G. Asceid, M. Moeneclaey, Proceedings of ICDSC 1992, Copenhagen, Denmark, pp. 255–262.

"A New Pattern Jitter Free Frequency Error Detector", by Thomas Alberty and Volker Hespelt, IEEE Transactions on Communications, vol. 37, No. 2, Feb. 1989, pp. 159–163.

* cited by examiner

DIGITAL RADIO RECEIVER LOCK DETECTOR

CROSS REFERENCE TO RELATED APPLICATIONS

This application claims priority from the provisional application designated serial No. 60/079,450 filed Mar. 26, 1998 and entitled "A Structure Serving as Lock Detector in Feedback Carrier Recovery Schemes at a Receiver in Digital Signal Transmission".

BACKGROUND OF THE INVENTION

The present invention relates to communications, and in particular to a digital radio receiver lock detector for use in carrier signal recovery.

Radio architecture has remained remarkably constant—for fifty years radios have been designed around the classic superheterodyne approach. For example, in conventional cellular basestations, each channel has a dedicated receiver tuned exclusively to that specific channel. Each of these receivers requires a fair degree of power, size and expense. This architecture leads to a lot of expensive dedicated receivers in a basestation. Not only are these channels expensive, they are fixed/custom built for a given air interface/modulation standard (e.g., exclusively for AMPS), and tuned for a given channel setting.

However, developments in digital signal processing (DSP) and data conversion are providing radio receiver designers with the tools for more efficient architectures. For example, in the field of wireless base stations, wideband receivers have offered significant benefits, including reductions in base station cost, size, complexity, and power consumption of a basestation. In addition, wideband digital receivers can be rapidly configured to support a variety of air interface/modulation schemes and protocols (e.g., AMPS, NAMPS, TDMA, CDPD, etc.) simultaneously, and switching between them whenever required. Significantly, since the wideband digital receiver processing is performed in software (i.e., in a DSP), the receiver can easily be programmed can support new protocols as they were developed.

In a wideband receiver, the wideband signal is captured, bandshifted to IF and digitized using the single wide-band data converter, which provides a digitized IF signal. The digitized IF signal is then input to a plurality of digital tuners, which each mix and filter the digitized IF signal to recover one of the individual channels associated with the tuner. For example, if there are 60 channels each 30 kHz wide, then the receiver must have a bandwidth of at least 3.6 MHz. Advantageously, the wideband receiver is shared between all the channels, instead of having a narrow band receiver assigned to each channel. Of course, each channel still requires its own circuitry for the final processing, which is all digital.

In addition, the flexibility of the digital stage means that the basestation can be "reprogrammed" to work with new standards. For example, some channels may operate with the conventional analog cellular standard (AMPS), while others use the newer digital IS-54 (TDMA) standard. Notably, because the decoding is performed by software, it can be changed "on the fly", so the mix of channels between standards can be changed as required. Indeed, even the channel becomes flexible—with complete freedom to change from 30 kHz of AMPS or TDMA, to 10 kHz for NAMPS or 1.25 MHz for CDMA. This can be done channel-by-channel as desired.

Since wideband receivers are preferably programmable, each channel digital tuner must accurately lock onto the frequency it is assigned to recover.

Therefore, there is a need for a robust and accurate digital radio receiver carrier lock detector.

SUMMARY OF THE INVENTION

Briefly, according to the present invention, a digital radio tuner lock detector receives an in-phase (I) data signal and a quadrature (Q) data signal. The lock detector processes these signals to compute a data signal power estimate and integrates the data signal power estimate to provide a threshold signal value. The lock detector also includes a carrier frequency lock detector and a carrier phase lock detector. The carrier frequency lock detector receives the I and Q data signals and computes a frequency error signal and integrates the frequency error signal to provide an integrated frequency error signal. The carrier frequency lock detector compares the magnitude of the integrated frequency error signal to the threshold signal value to determine if frequency lock has been achieved and provides a frequency lock status signal indicative thereof. The carrier phase lock detector receives the I and Q data signals and computes a phase error signal and integrates the phase error signal to provide an integrated phase error signal. The phase lock detector also compares the magnitude of the integrated phase error signal to the threshold signal value to determine if carrier phase lock has been achieved.

Carrier frequency recovery occurs first and when the carrier frequency lock detector identifies carrier frequency lock, carrier phase recovery is then performed. Once the carrier phase lock detector identifies phase lock, accurately received data is available for signal processing.

The carrier frequency and phase lock detector can be applied to many multi-phase and/or multi-amplitude modulation techniques (e.g., M-PSK, M-QAM, PAM). In addition, the detector can be used in acquisition mode (i.e., transitional phase) and/or tracking mode (i.e., steady state phase). The detector can especially enhance the performance of non-decision-aided feedback loop systems.

The detector may be employed in either full digital demodulators (i.e., parameter estimation and correction are performed digitally) or hybrid demodulators (i.e., parameter estimation is performed digitally and carrier frequency and phase correction are performed in the continuous time domain).

These and other objects, features and advantages of the present invention will become apparent in light of the following detailed description of preferred embodiments thereof, as illustrated in the accompanying drawings.

DETAILED DESCRIPTION OF THE INVENTION

Figure 1:
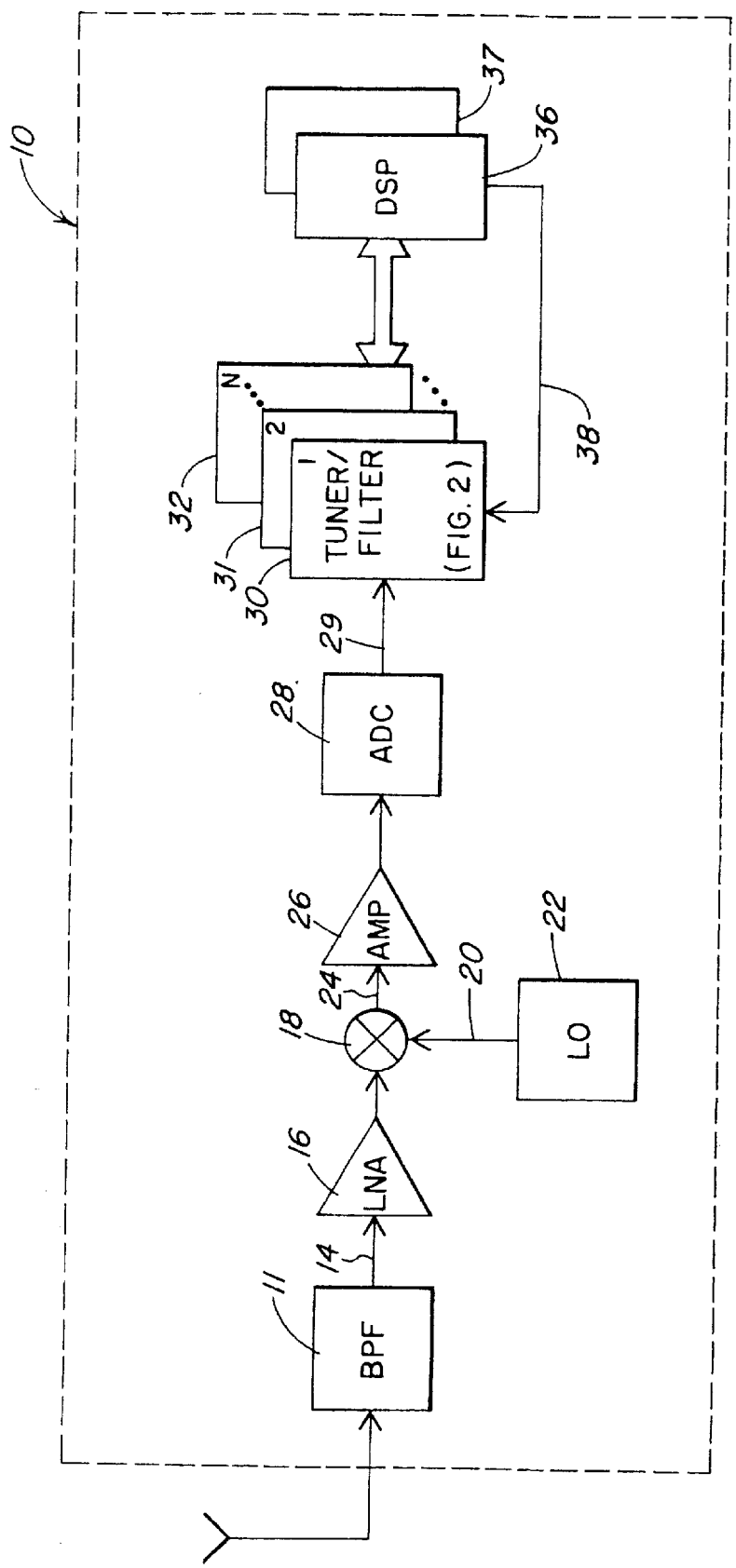
FIG. 1 is a block diagram illustration of a wideband digital radio receiver.

FIG. 1 is a block diagram illustration of a wideband digital radio receiver 10. The receiver includes bandpass filter (BPF) 11 that provides a bandpassed signal on a line 14 to a low noise amplifier (LNA) 16. The LNA 16 provides a signal to a mixer 18, which also receives a signal on a line 20 from a local oscillator (LO) 22. The mixer 18 provides a bandshifted signal on a line 24 at an IF frequency (e.g., 70 MHz) to a amplifier 26. Analog-to-digital converter (ADC) 28 provides a wideband digitized signal on a line 29 to a plurality of dynamic tuners 30–32.

Each tuner 30–32 may be set to recover a different carrier signal value from the wideband digitized signal on the line 29. For example, one or more digital signal processors (DSPs) 36, 37 may provide control signals on a line 38 that set-up the tuners to recover the desired modulated data signal. Significantly, this allows the receiver to be dynamically configured to support a number of the air/modulation techniques and protocols (e.g., AMPS, NAMPS, TDMA, CDPD, etc . . . . An example of a suitable DSP is the model number ADSP-21-061 available from Analog Devices, Inc., the assignee of the present invention.

Figure 2:
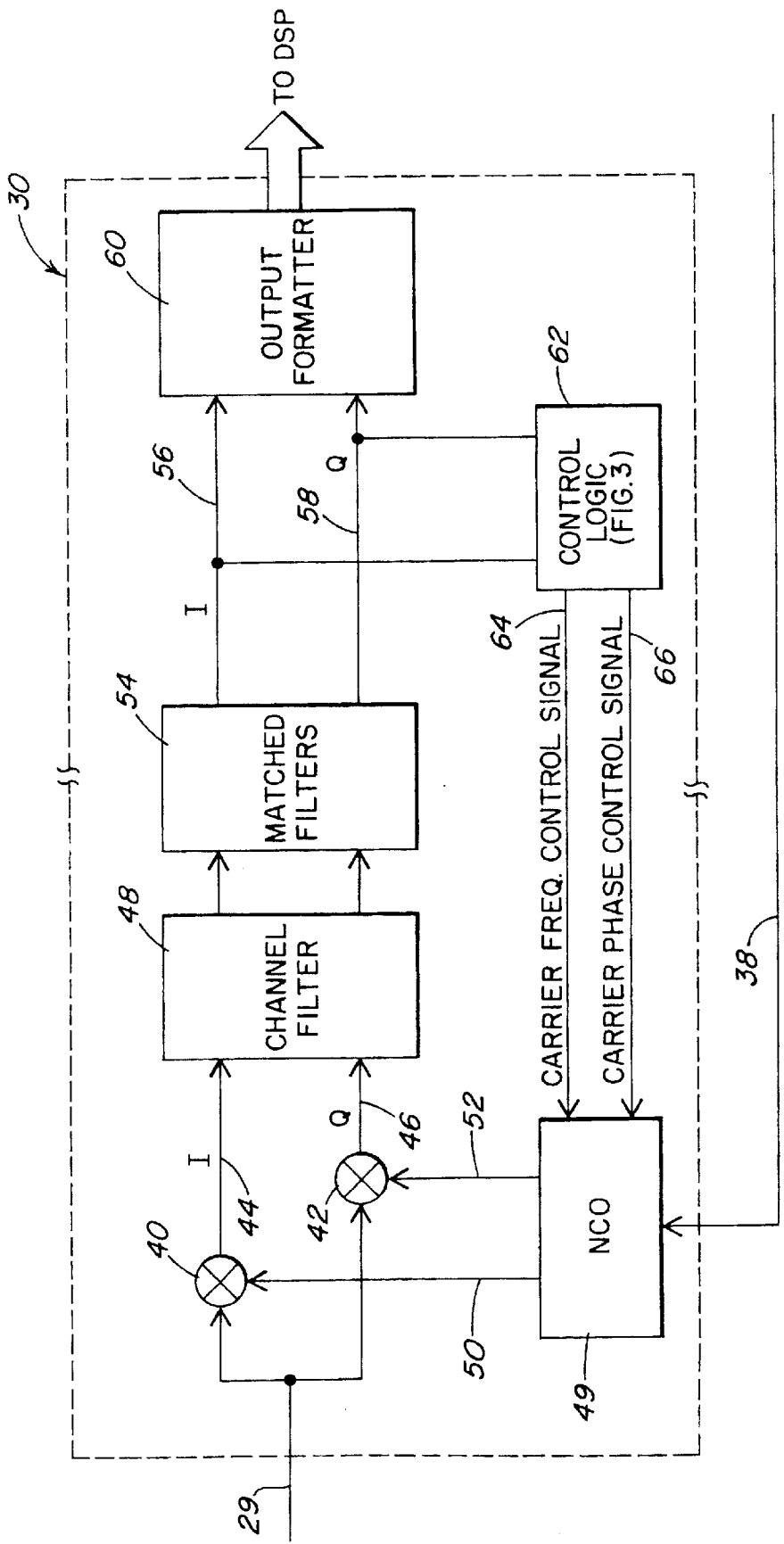
FIG. 2 is a block diagram illustration of a tuner of the digital radio receiver.

FIG. 2 is a block diagram illustration of the tuner 30. The signal on the line 29 is input to signal multipliers 40, 42 that provide in-phase (I) and quadrature (Q) signals on lines 44, 46, respectively, to channel filters 48. The signal multipliers 40, 42 also receive carrier recovery signals on lines 50, 52 generated by a numerically controlled oscillator (NCO) 49. The channel filters provide in-phase and quadrature signals to matched filters 54, which provide filtered signals on lines 56, 58 that are input to an output formatter 60 and tuner lock detector control logic 62.

According to the present invention, the tuner lock detector control logic 62 processes the signals to provide a carrier frequency adjustment signal and a phase adjustment signal on lines 64, 66 respectively. These adjustment signals regulate the signals on the lines 50, 52 in order to more accurately lock the tuner 30 onto the desired carrier signal within the spectrum of the wideband digitized signal on the line 29. The control logic 62 and the NCO 49 provide a carrier recovery circuit, including a PLL.

In a preferred embodiment the control logic 62 is located within the tuner 30, which may be a dedicated integrated circuit (IC). However, in an alternative embodiment the function of the control logic 62 may be performed as a series of executable program steps within the DSP 36 (FIG. 1).

Figure 3:
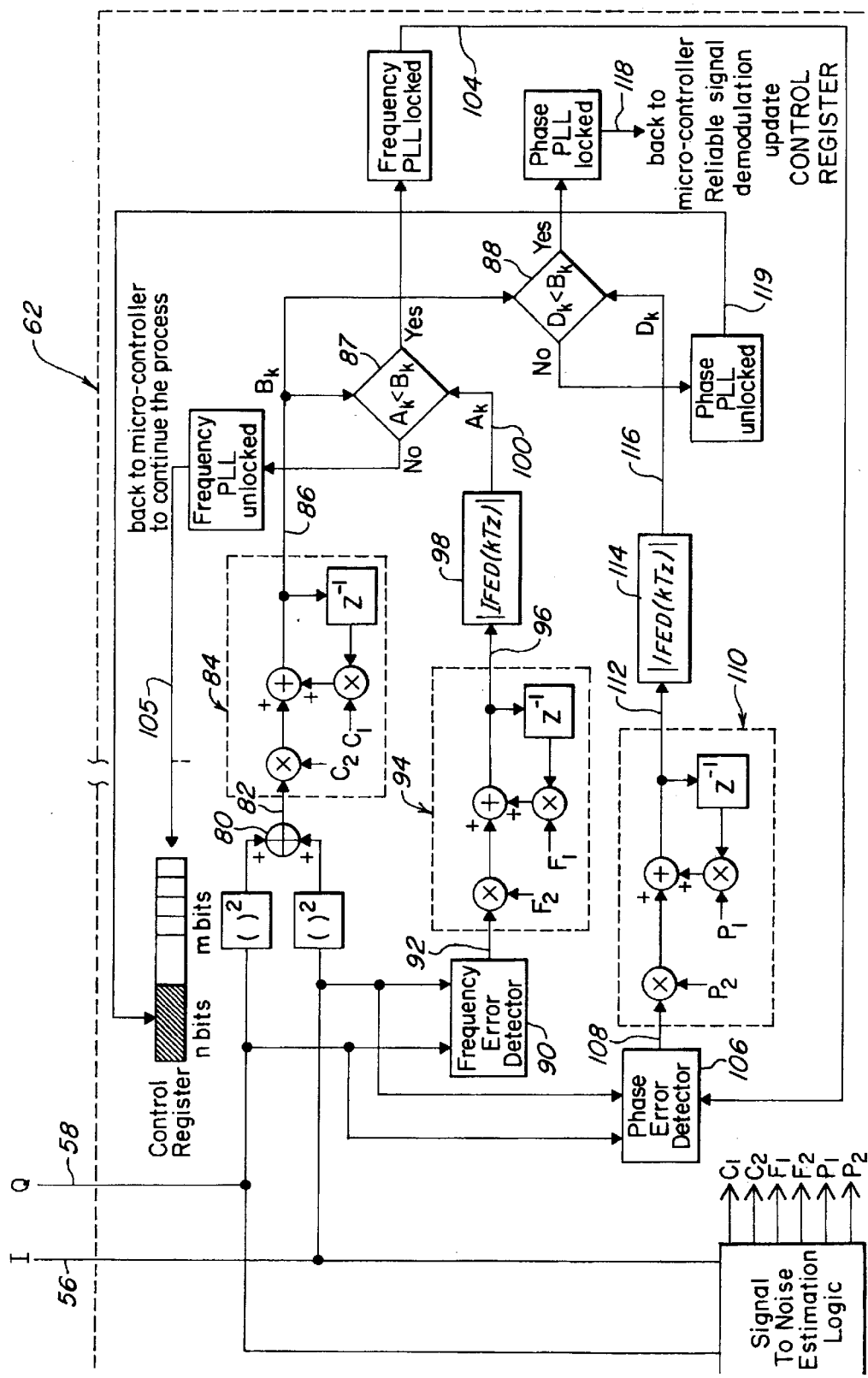
FIG. 3 is a functional illustration of control logic within the tuner.

FIG. 3 is a functional illustration of the control logic 62. The description that follows relates to the architecture of a receiver complaint to the DVB standards. However, one of ordinary skill will recognize that the present invention is certainly not limited to this standard. It is contemplated that the present invention may be used in DSS systems, terrestrial radio and cable digital broadcasting systems, in digital personal or cellular communication systems (e.g., PHS, PDC Japanese cordless and digital radio cellular standards, IS-54, IS-136 American digital radio standards). The proposed carrier recovery techniques (frequency offset and phase rotation) use one sample per symbol, preferably sampling at the output of the matched filters 54 (FIG. 2) when the "eye opening" is at a maximum to minimize ISI. The signals on the lines 56, 58 are each squared and the resultant squared signals are input to a summer 80 that provides a summed value on a line 82, indicative of instantaneous data signal power. The power signal on the line 82 is input to an integrator 84, which provides an integrated power signal on a line 86. The integrator may be implemented as a Canonical Signed Digits (CSD) structure. The integrated power signal on the line 86 can be expressed as:

$$I(kT_S) = (C_1 * I((k-1)T_S)) + (C_2 * P(kT_S)) \qquad \text{EQ. 1}$$

where:

$C_1, C_2$ are coefficients;

$P(kT_S)$ is the input signal to the integrator 84 for the k-th symbol;

$T_s$ = sample period; and $I(kT_S)$ is the integrated signal power on the line 86 for the k-th symbol.

The integrated power signal on the line 86 is used as a threshold value Bk for comparators 87, 88, which shall be discussed in detail hereinbelow.

The signals on the lines 56, 58 are also input to a frequency error detector 90 that provides an estimated frequency error signal on a line 92. This signal is indicative of the difference between the frequency of the signal from the NCO 49 (FIG. 2), and the carrier to be recovered within the spectrum of the wideband digitized signal on the line 29. The estimated frequency error signal is input to an integrator 94, which provides an integrated estimated frequency error signal on a line 96 to an absolute value function 98. The resultant absolute value $A_k$ is provided on a line 100 input to the comparator 87.

The comparator 87 compares the signal on the line 100 against the threshold value $B_k$ on the line 86. If the signal on the line 100 is less than the threshold value on the line 86, then the NCO 49 (FIG. 2) has locked onto the desired carrier frequency. Therefore, the comparator 87 provides a carrier frequency lock signal on a line 104 indicating that carrier frequency recovery has been completed. Otherwise, the comparator 87 provides a frequency unlocked signal on a line 105 to the NCO to adjust or readjust the frequency of the signal(s) from the NCO. One of ordinary skill will recognize that the frequency lock signal and the frequency unlocked signal may be combined into a single bit.

The carrier frequency lock signal on the line 104 is input to a phase error detector 106, to enable the phase error detector 106. That is, phase lock detection is performed after the frequency lock detector has detected frequency lock. The detector 106 also receives the signals on the line 56, 58 and uses these signals to compute an estimated phase error signal, which is provided on a line 108. This signal is indicative of the difference between the phase of the signal from the NCO 49 (FIG. 2) and the phase of the carrier signal to be recovered within the spectrum of the wideband digitized signal on the line 29. The estimated phase error signal is input to an integrator 110, which provides an integrated estimated phase error signal on a line 112 to an absolute value function 114. The resultant absolute value $D_k$ is provided on a line 116 and input to the comparator 88.

The comparator 88 compares the signal on the line 116 against the threshold value $B_k$ on the line 86. If the signal on the line 116 is less than the threshold value on the line 86, then the NCO 49 (FIG. 2) has locked onto the desired carrier phase. Therefore, the comparator 88 provides a carrier phase lock signal on a line 118 indicating the carrier phase recovery has been completed. Otherwise, the comparator 88 provides a phase unlocked signal on a line 119 to adjust the phase of the signal(s) on the lines 50, 52 (FIG. 2) from the NCO. Again, one of ordinary skill will recognize that the phase lock signal and the phase unlocked signal may be combined into a single bit.

The values $C_1, C_2, F_1, F_2, P_1$ and $P_2$ within the integrators 84, 94 and 110 are computed by signal-to-noise estimator. General constraints on these values include:

$C + C_2$ = constant value (e.g., 1);

$F_1 + F_2$ = constant value (e.g., 1);

$P_1 + P_2$ constant value (e.g., 1);

$C_2 \gg C_1$;

$F_2 \gg F_1$; and $P_2 \gg P_1$.

Alternatively, values $C_1, C_2, F_1, F_2, P_1$, and $P_2$ may be set to constant values. Threshold $B_k$ varies in accordance to the estimated signal quality (signal power). $A_k$ relates to the integrated period. The longer the integrated period the smaller the $A_k$ value. As the Frequency PLL tends to lock the integrated instant Signal Power $I_{cp}(kT_s)$ of the $k_{th}$ symbol converges to its nominal signal power $cp_{nom}$ ($cp_{nom}=1.0$ in DVB simulation).

If channel characteristics change abruptly and force either the frequency or phase to unlock, the process described above is repeated until both are again locked.

Although the present invention has been shown in the context of a digital receiver, the present invention is clearly not so limited. It is contemplated that the tuner lock detector control logic 62 may be implemented digitally, while the NCO signal correction logic responsive to the carrier frequency adjustment signal and a phase adjustment on lines 64, 66 may implemented in the continuous time domain (i.e., with analog circuitry).

Although the present invention has been shown and described with respect to several preferred embodiments thereof, various changes, omissions and additions to the form and detail thereof, may be made therein, without departing from the spirit and scope of the imvention.

What is claimed is:

1. A digital radio tuner lock detector that receives an in-phase (I) data signal and a quadrature (Q) data signal to determine carrier frequency and phase lock, comprising:
   means responsive to the I and Q data signals for computing a signal power estimate and integrating said signal power estimate to provide a threshold signal value;
   means responsive to the I and Q data signals for computing a frequency error signal and for integrating said frequency error signal to provide an integrated frequency error signal;
   means for comparing the magnitude of said integrated frequency error signal to said threshold signal value to determine if frequency lock has been achieved and for providing a frequency lock signal indicative thereof; and
   means responsive to the I and Q data signals, and said frequency lock signal, for computing a phase error signal and integrating said phase error signal to provide an integrated phase error signal, and for comparing the magnitude of said integrated phase error signal to said threshold signal value to determine if phase lock has been achieved, and for providing a phase lock signal indicative thereof when said frequency lock signal is active.

2. The digital radio tuner lock detector of claim 1, wherein said means responsive to said I and Q data signals for computing a signal power estimate and integrating said signal power estimate to provide a threshold signal value comprises:
   means for computing the square of the I data signal and providing a first squared signal;
   means for computing the square of the Q data signal and providing a second squared signal;
   a summer for summing said first and second squared signals and providing a summed signal; and
   an integrator that integrates said summed signal to provide a signal indicative of said threshold signal value.

3. The digital radio tuner lock detector of claim 1, wherein said lock detector is located on an integrated circuit.

4. The digital radio tuner lock detector of claim 1, wherein said lock detector is implemented in a processor with a plurality of executable program instructions.

5. A carrier signal recovery control circuit that receives digitized in-phase and quadrature data signals, and provides control signals to a numerically controlled oscillator to adjust the frequency and phase of a carrier recovery signal, said control circuit comprising:
   means for providing a threshold signal value that is proportional to an integrated power signal value indicative of the integrated power of the in-phase and quadrature data signals;
   a frequency error detector that receives and process the in-phase and quadrature data signals to provide an estimated frequency error signal indicative of the difference between the frequency of the carrier recovery signal and the carrier to be recovered within the spectrum of the data signals;
   a first integrator that integrates said estimated frequency error signal to provide an integrated estimated frequency error signal;
   a first comparator that compares said integrated estimated frequency error signal to said threshold signal value and provides a frequency lock signal if the magnitude of said integrated estimated frequency error signal is less than said threshold signal value;
   a phase error detector that receives the in-phase and quadrature data signals and processes the data signals to provide an estimated phase error signal indicative of the difference between the phase of the carrier recovery signal and the desired carrier within the spectrum of the data signals;
   a second integrator that integrates said estimated phase error signal to provide an integrated estimated phase error signal; and
   a second comparator that compares said integrated estimated phase error signal to said threshold signal value and provides a phase lock signal if the magnitude of said integrated estimated phase error signal is less than said threshold signal value and said frequency lock signal indicates that the magnitude of said integrated estimated frequency error signal is less than said threshold signal value.

6. The carrier signal recovery control circuit of claim 5, wherein said means for providing a threshold signal value comprises:
   means for computing the square of said in-phase data signal and providing a first squared signal;
   means for computing the square of said quadrature data signal and providing a second squared signal;
   a summer for summing said first and second squared signals and providing a summed signal; and
   an integrator that integrates said summed signal to provide a signal indicative of said integrated power signal value.

7. A method of processing an in-phase (I) data signal and a quadrature (Q) data signal to determine carrier frequency and phase lock, said method comprising the steps of:
   computing a signal power estimate using the I and Q data and integrating said signal power estimate to provide a threshold signal value;
   computing a frequency error signal and integrating said frequency error signal to provide an integrated frequency error signal;
   comparing the magnitude of said integrated frequency error signal to said threshold signal value to determine if frequency lock has been achieved and for providing a frequency lock signal indicative thereof; and
   computing a phase error signal using the I and Q data signals, integrating said phase error signal to provide an integrated phase error signal and comparing the magnitude of said integrated phase error signal to said threshold signal value to determine if phase lock has been achieved, and providing a phase lock signal indicative thereof when said frequency lock signal is active.

8. The method of claim 7, wherein said steps of processing the I and Q data signal to determine carrier frequency and phase lock are performed as executable program instructions within a digital signal processor.

* * * * *